US009761870B2

(12) United States Patent
Wu et al.

(10) Patent No.: US 9,761,870 B2
(45) Date of Patent: Sep. 12, 2017

(54) LITHIUM ION BATTERIES

(71) Applicants: Tsinghua University, Beijing (CN); HON HAI PRECISION INDUSTRY CO., LTD., New Taipei (TW)

(72) Inventors: Yang Wu, Beijing (CN); Heng-Cai Wu, Beijing (CN); Shu Luo, Beijing (CN); Jia-Ping Wang, Beijing (CN); Kai-Li Jiang, Bejing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 290 days.

(21) Appl. No.: 14/598,104

(22) Filed: Jan. 15, 2015

(65) Prior Publication Data
US 2015/0207143 A1  Jul. 23, 2015

(30) Foreign Application Priority Data
Jan. 23, 2014 (CN) .......................... 2014 1 0031882

(51) Int. Cl.
*H01M 10/052* (2010.01)
*H01M 4/36* (2006.01)
*H01M 4/133* (2010.01)
*H01M 10/0525* (2010.01)
*B82Y 30/00* (2011.01)

(52) U.S. Cl.
CPC ........... *H01M 4/366* (2013.01); *H01M 4/133* (2013.01); *H01M 10/0525* (2013.01); *B82Y 30/00* (2013.01)

(58) Field of Classification Search
CPC .......................... H01M 4/133; H01M 10/0525
See application file for complete search history.

(56) References Cited

U.S. PATENT DOCUMENTS

| 2009/0311598 | A1* | 12/2009 | Tadano | H01M 4/13 429/215 |
| 2010/0216023 | A1 | 8/2010 | Wei et al. | |
| 2012/0040238 | A1* | 2/2012 | Wu | H01M 2/30 429/161 |

(Continued)

FOREIGN PATENT DOCUMENTS

| CN | EP 2037516 A1 * | 3/2009 | ............ H01M 4/131 |
| CN | 103187575 | 7/2013 | |

(Continued)

*Primary Examiner* — Olatunji Godo
(74) *Attorney, Agent, or Firm* — Steven Reiss

(57) ABSTRACT

A lithium ion battery includes at least one cathode electrode, at least one anode electrode, and an electrolyte. The cathode electrode includes at least one first carbon nanotube paper and at least one cathode electrode plate. The cathode electrode plate locates on a surface of the at least one first carbon nanotube paper, and includes a plurality of stacked first carbon nanotube films. A cathode active material is dispersed in the plurality of first carbon nanotube films. An anode electrode includes at least one first second carbon nanotube paper and at least one first anode electrode plate. The anode electrode plate is located on a surface of the at least one first second carbon nanotube paper, and includes a plurality of stacked second carbon nanotube films. An anode active material is dispersed in the plurality of second carbon nanotube films.

17 Claims, 18 Drawing Sheets

(56) References Cited

U.S. PATENT DOCUMENTS

2013/0168013 A1 7/2013 Wang et al.

FOREIGN PATENT DOCUMENTS

| EP | 2037516 | 3/2009 |
| JP | 2010-512298 | 4/2010 |
| TW | 201401622 | 1/2014 |
| WO | 2013158174 | 10/2013 |
| WO | WO2013158174 | 10/2013 |

* cited by examiner

LITHIUM ION BATTERIES

CROSS-REFERENCE TO RELATED APPLICATIONS

This application claims priority to Chinese Patent Application No. 201410031882.8, filed on Jan. 23, 2014, the disclosure of which is incorporated herein by reference.

FIELD

The present disclosure relates to lithium ion batteries.

BACKGROUND

An electrode of a lithium ion battery includes a current collector and an electrode material layer located on a surface of the current collector. The conventional current collector is made of metal foil. For example, an anode current collector is made of a copper foil or a nickel foil, and a cathode current collector is made of an aluminum foil or a titanium foil. The electrode material layer includes an electrode active material, a conductive agent and a binder mixed with each other. The current collector and the binder are inactive matters that take a big part in the lithium ion battery.

BRIEF DESCRIPTION OF THE DRAWINGS

Implementations of the present technology will now be described, by way of example only, with reference to the attached figures.

DETAILED DESCRIPTION

Figure 1:
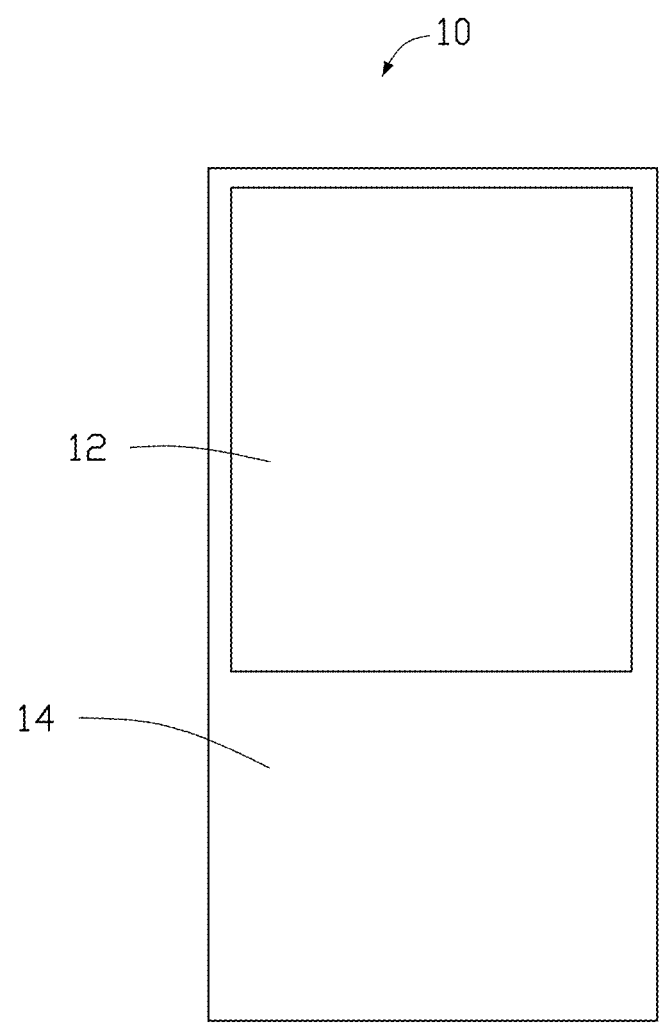
FIG. 1 is a structural view of one embodiment of a cathode electrode of a lithium ion battery.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other description that is described, such that the component need not be exactly conforming to the description. The term "comprise" or "comprising" when utilized, means "include or including, but not necessarily limited to"; it specifically indicates open-ended inclusion or membership in the so-described combination, group, series, and the like.

Figure 2:
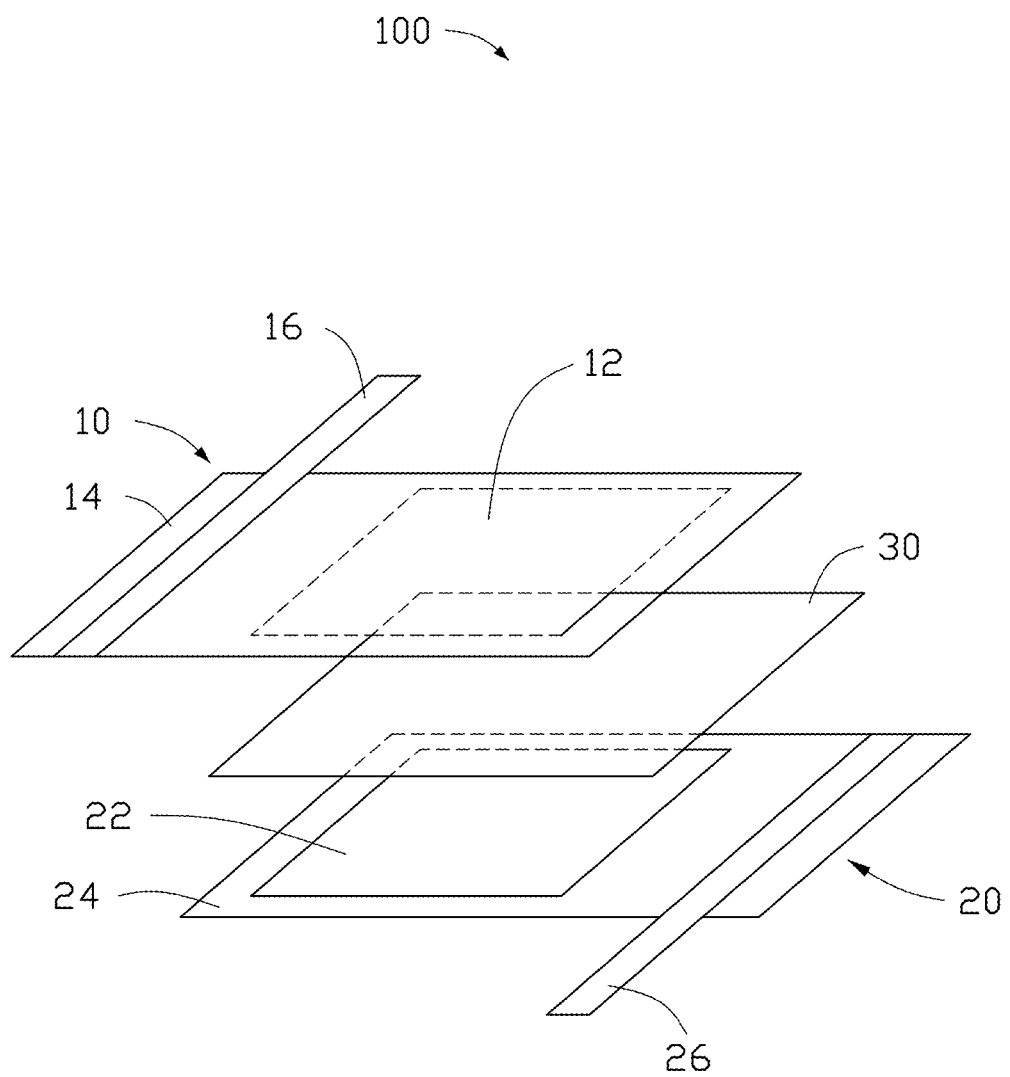
FIG. 2 is an exploded view of one embodiment of the lithium ion battery.

FIG. 1 and FIG. 2 illustrate that one embodiment of a lithium ion battery 100 comprises a cathode electrode 10, an anode electrode 20, and an electrolyte.

The cathode electrode 10 can comprise a carbon nanotube paper 14 and a cathode electrode plate 12. The cathode electrode plate 12 can be consisted of a plurality of carbon nanotube films and cathode active materials. The plurality of carbon nanotube films are stacked on each other. The cathode active materials are uniformly dispersed in the carbon nanotube films.

Each carbon nanotube film can consist of a plurality of carbon nanotubes. The cathode active materials are adsorbed on walls of the carbon nanotubes. An amount of the carbon nanotube films in the cathode electrode plate 12 is not limited. In one embodiment, the cathode electrode plate 12 comprises 3 layers to 6 layers of carbon nanotube films. A large number of the carbon nanotubes in each carbon nanotube film are arranged substantially along the same direction, namely, each carbon nanotube film is an ordered carbon nanotube film.

Figure 3:
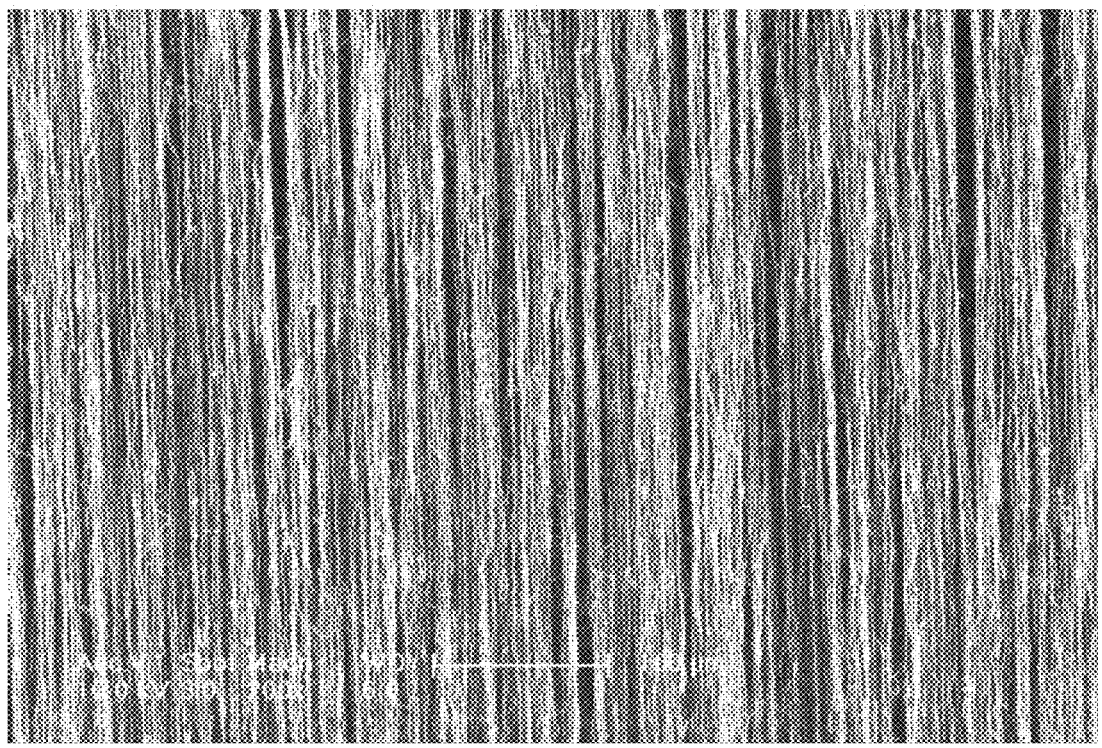
FIG. 3 is a scanning electron microscope (SEM) image of a drawn carbon nanotube film.

FIG. 3 illustrates that in one embodiment, the ordered carbon nanotube film can be a drawn carbon nanotube film formed by drawing from a carbon nanotube array, and is a free-standing structure. The drawn carbon nanotube film consists of a plurality of carbon nanotubes. The plurality of carbon nanotubes in the drawn carbon nanotube film are arranged substantially parallel to a surface of the drawn carbon nanotube film. A majority number of the carbon nanotubes in the drawn carbon nanotube film can be oriented along a preferred orientation, meaning that a majority number of the carbon nanotubes in the drawn carbon nanotube film are arranged substantially along a same direction. An end of one carbon nanotube is joined to another end of an adjacent carbon nanotube arranged substantially along the same direction by van der Waals force, to form a free-standing film. A small number of the carbon nanotubes are randomly arranged in the carbon nanotube film, and have a small if not negligible effect on the greater number of carbon nanotubes in the carbon nanotube film, that are arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curved portions may exist. It can be understood that contact between some carbon nanotubes located substantially side by side and oriented along the same direction cannot be totally excluded.

The drawn carbon nanotube film can comprise a plurality of successively oriented carbon nanotube segments joined end-to-end by van der Waals force. Each carbon nanotube segment comprises a plurality of carbon nanotubes substantially parallel to each other, and joined by van der Waals force. The carbon nanotube segments can vary in width, thickness, uniformity, and shape. The carbon nanotubes in the carbon nanotube film are also substantially oriented along a preferred orientation. The width of the carbon nanotube film relates to the carbon nanotube array from which the carbon nanotube film is drawn. Furthermore, the drawn carbon nanotube film has an extremely large specific surface area, and is very sticky.

The drawn carbon nanotube film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube film is placed between two separate supporters, a portion of the carbon nanotube film, not in contact with the two supporters, would be suspended between the two supporters and yet maintain film structural integrity. The free-standing structure of the carbon nanotube film is realized by the successive carbon nanotubes joined end to end by Van der Waals force.

Figure 4:
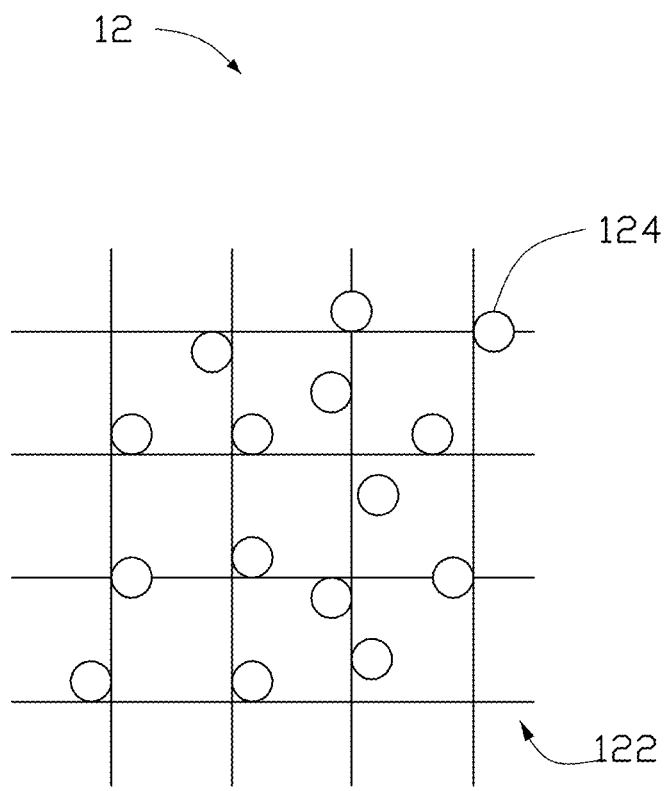
FIG. 4 is a structural view of one embodiment of a cathode electrode plate of the lithium ion battery.
Figure 5:
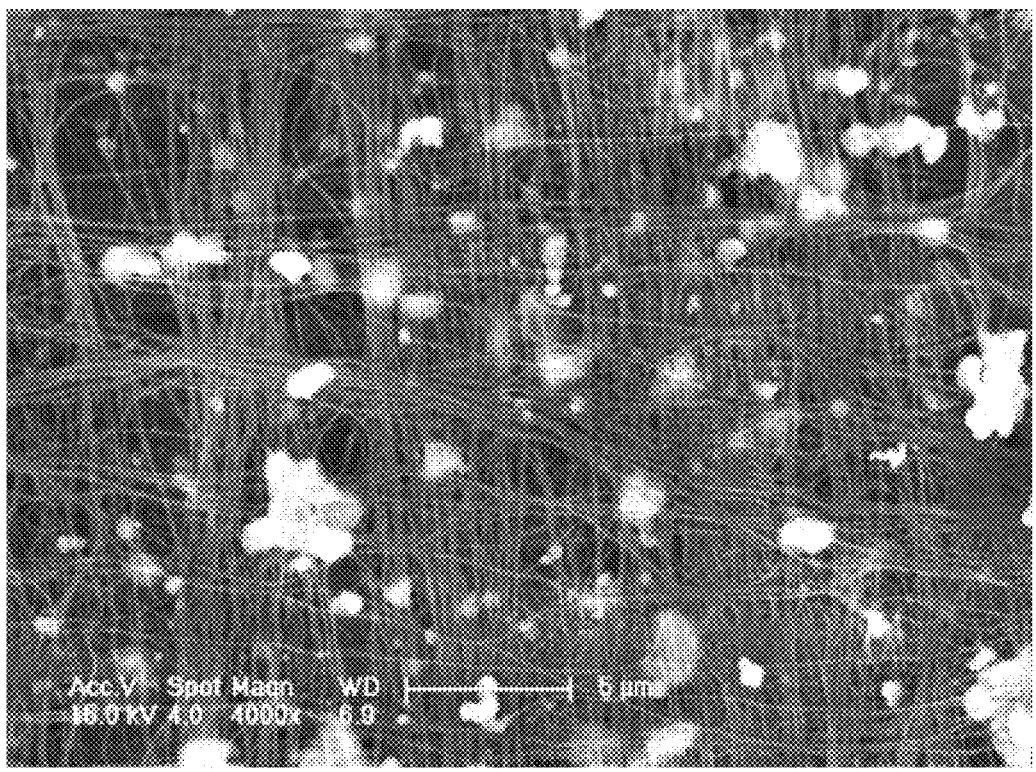
FIG. 5 is a SEM image of the cathode electrode plate of the lithium ion battery.
Figure 6:
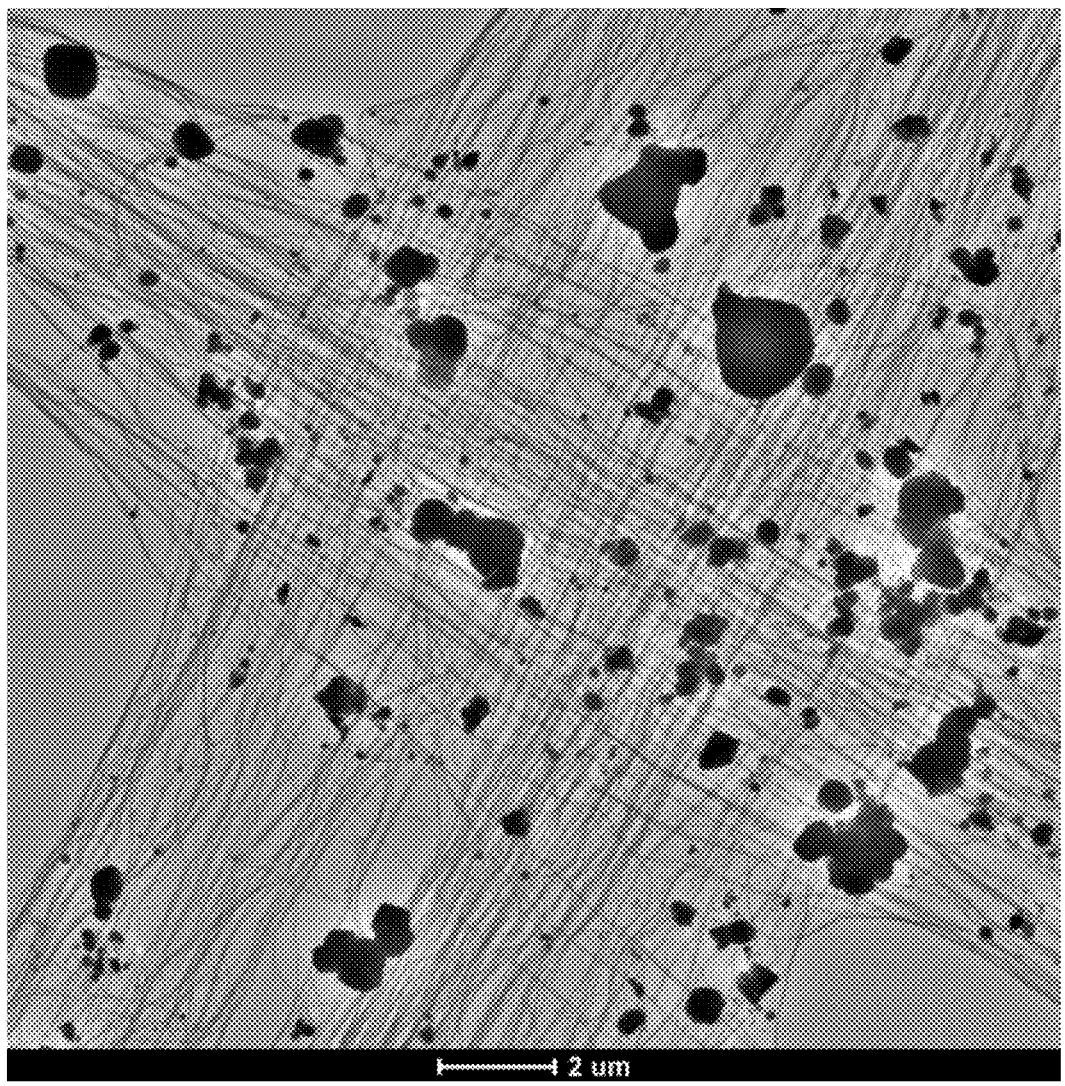
FIG. 6 is a transmission electron microscopy (TEM) image of the cathode electrode plate of the lithium ion battery.

FIG. 4 to FIG. 6 illustrate that the cathode electrode plate 12 can comprise a plurality of stacked carbon nanotube films. An angle can exist between the oriented directions of the carbon nanotubes in adjacent different carbon nanotube films. An angle α between the oriented directions of the carbon nanotubes in two adjacent carbon nanotube films can be in a range from about 0° to about 90° (0°<α≤90°. In one embodiment, the angle α is 90°. The plurality of the carbon nanotubes in the stacked carbon nanotube films directly contact and attach to each other due to the van der Waals force to form a free-standing carbon nanotube network structure 122. The adjacent carbon nanotubes are connected with each other so the carbon nanotube network structure 122 is conductive. The thickness of the carbon nanotube network structure 122 having 3 layers to 6 layers of carbon nanotube films is in a range from 10 nm to 100 nm. The carbon nanotube network structure 122 has a uniform thickness and a uniform conductivity.

The cathode active material 124 can be a commonly used cathode active material, such as lithium transition metal oxides. The lithium transition metal oxides can be lithium iron phosphate, lithium cobalt oxides, lithium manganese oxide, $LiAl_{1/4}Ni_{3/4}O_2$, $LiGa_{0.02}Ni_{1.98}O_2$, $LiNi_{0.5}Mn_{1.5}O_4$, $LiNi_{0.5}Mn_{0.5}O_2$, $LiNi_{0.8}Co_{0.2}O_4$, $LiFe_{0.8}Co_{0.8}O_4$, $LiNi_{1/3}Mn_{1/3}Co_{1/3}O_2$, and $LiNi_{0.375}Mn_{0.375}Co_{0.25}O_2$. The cathode active material 124 can have a shape of particles or grains. A particle or grain size of the cathode active material 124 can be in a range from 0.1 nm to 100 μm. The cathode active material 124 can be uniformly dispersed in the carbon nanotube network structure 122. The cathode active material 124 can be fixed on the carbon nanotube network structure 122 through the adsorption of the walls of the carbon nanotubes. FIG. 4 to FIG. 6 illustrate that the cathode active material 124 is not filled in all the gaps between the carbon nanotubes in the carbon nanotube films, and does not completely coat the carbon nanotubes. The walls of a majority number of the carbon nanotubes are not coated by the cathode active material 124. The walls, without coating by the cathode active material 124 of the adjacent carbon nanotubes, can be directly connected with each other to form a conductive network for improving the electronic conductivity. Because there are the gaps between the carbon nanotubes in the carbon nanotube films, the cathode electrode plate 12 is a porous structure, which is good for the penetration of the electrolyte, thus improves the ionic conductivity. FIG. 4 is a schematic drawing, and it shows no limit of each of the cathode active material 124 only contacting with one carbon nanotube in the same direction. FIG. 5 and FIG. 6 illustrate that the cathode active material 124 can contact with a plurality of carbon nanotubes, thus it will improve the electronic conductivity.

The cathode electrode plate 12 can consist of the cathode active material 124 and the carbon nanotube films. The carbon nanotube film of the cathode electrode plate 12 can conduct electricity and adhere to the cathode active material 124 by the van der Waals force without other adhesive and conductive agent.

Figure 7:
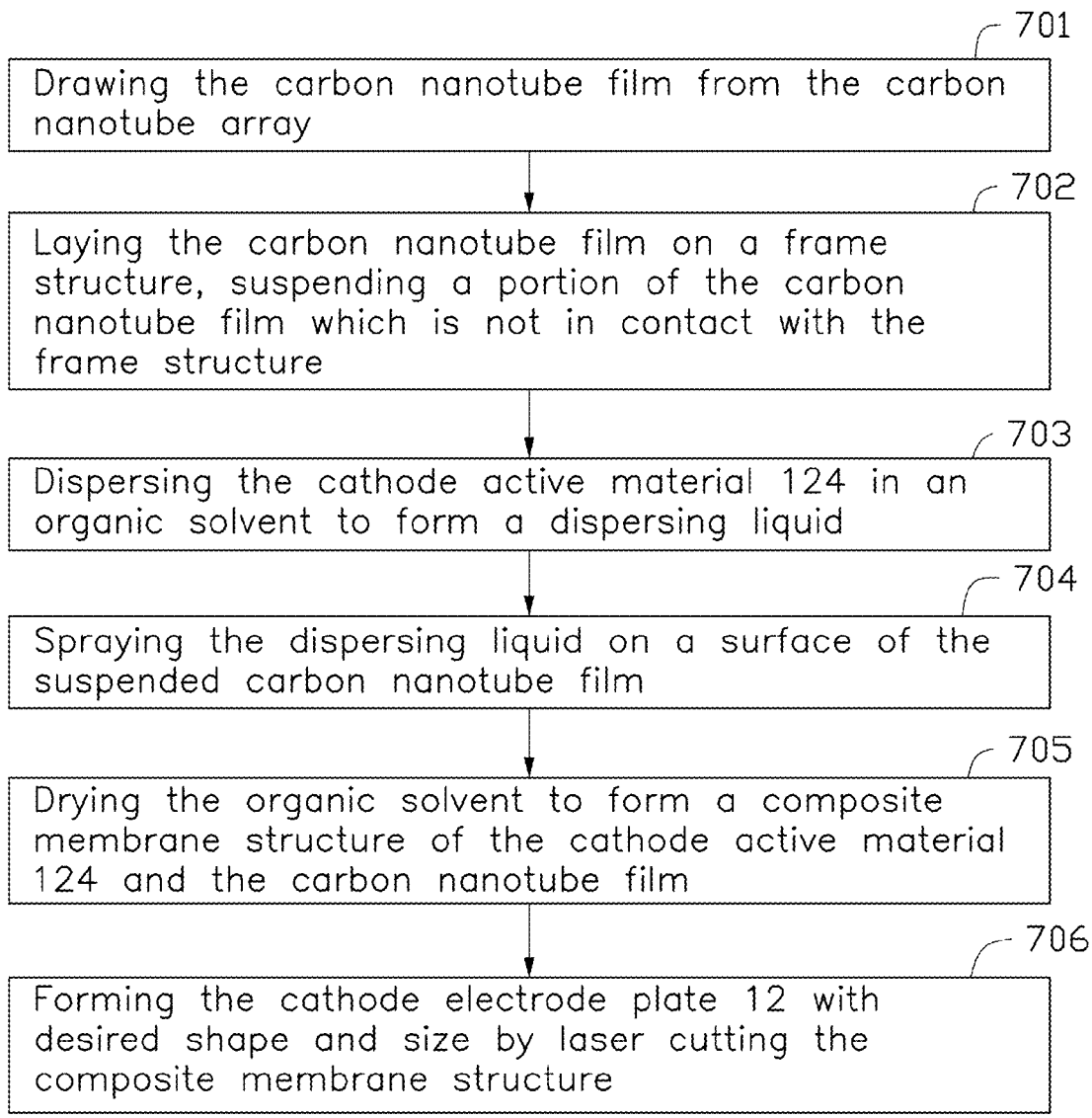
FIG. 7 is flowchart of a method for making the cathode electrode plate.

Referring to FIG. 7 a flowchart is presented in accordance with an example embodiment as illustrated. The embodiment of a method 700 is provided by way of example, as there are a variety of ways to carry out the method. The method 700 described below can be carried out using the configurations illustrated in FIGS. 1 to 6 for example, and various elements of these figures are referenced in explaining example method 700. Each block shown in FIG. 7 represents one or more processes, methods, or subroutines carried out in the exemplary method 700. Additionally, the illustrated order of blocks is by example only and the order of the blocks can be changed. The exemplary method 700 can begin at block 701. Depending on the embodiment, additional steps can be added, others removed, and the ordering of the steps can be changed.

At block 701, the carbon nanotube film is drawn from the carbon nanotube array.

At block 702, the carbon nanotube film is laid on a frame structure. A portion of the carbon nanotube film, which is not in contact with the frame structure, is suspended. The carbon nanotube film is adhesive. Thus the carbon nanotube film can be directly adhered on the frame structure.

At block 703, the cathode active material 124 is dispersed in an organic solvent to form a dispersing liquid. The cathode active material 124 can be dispersed in the organic solvent by means of ultrasonic oscillation or mechanical stirring. The organic solvent can be volatile and capable of wetting the carbon nanotubes. The organic solvent can be wetting compounds such as ethanol, methanol, acetone, isopropyl alcohol, ethylene dichloride, or chloroform. The organic solvent can wet the carbon nanotubes, thus the dispersing liquid can be attached to a surface of the carbon nanotube film.

At block 704, the dispersing liquid is sprayed on a surface of the suspended carbon nanotube film.

At block 705, the organic solvent is dried to form a composite membrane structure of the cathode active material 124 and the carbon nanotube film.

At block 706, the cathode electrode plate 12 is formed with desired shape and size by laser cutting the composite membrane structure.

In some embodiments, a plurality of the carbon nanotube films can be stacked before spraying the dispersing liquid. Namely, the plurality of the carbon nanotube films can be laid on the frame structure along at least two different directions to form the carbon nanotube network structure 122 at first, and then the dispersing liquid can be sprayed on the surface of the carbon nanotube network structure 122. In the cathode electrode plate 12 formed by the above method, a majority number of the cathode active material 124 can be dispersed on the surface of the integrated carbon nanotube network structure 122. The dispersing liquid can be infiltrated into the inter structure of the carbon nanotube film structure without breaking the entire carbon nanotube film structure, and this can be achieved by spraying. Furthermore, the dispersing liquid can be uniformly adsorbed on surfaces of the carbon nanotubes because of the good wettability of the organic solvent.

In some embodiments, one carbon nanotube film can be laid on the frame structure first, and then the dispersing liquid can be sprayed on a surface of the carbon nanotube film. The second carbon nanotube film can be laid on the surface of the first carbon nanotube film which is sprayed by the dispersing liquid. The carbon nanotube network structure 122 can be formed as needed by repeating the above steps. In the cathode electrode plate 12 formed by the above method, the cathode active material 124 can be sandwiched between the adjacent carbon nanotube films. The cathode active material 124 can be caught by the carbon nanotubes of the carbon nanotube film, and adhered on the walls of the carbon nanotubes. Because the volatilization of the organic solvent makes the carbon nanotube film shrink, the thickness of the carbon nanotube film can be thin, and the adjacent drawn carbon nanotubes can be combined closely to improve the electrical conductivity. Because the carbon nanotube film is adhered on the frame, though the carbon nanotube film shrinks, the carbon nanotube film can still maintain a film shape. Thus, the cathode electrode plate 12 is a free-standing structure that can be removed from the frame.

The carbon nanotube film can be weighed before and after coating the cathode active material 124 respectively, in order to determine a weight of the cathode active material 124 in the cathode electrode plate 12. After the organic solvent is fully dried, the cathode electrode plate 12 can be removed from the frame structure, and located on a surface of a carbon nanotube paper 14. The cathode electrode plate 12 has a good flexibility. The cathode electrode plate 12 can be arbitrarily bent, curved or folded. For instance, the cathode electrode plate 12 can be folded into a predetermined size at first, and then positioned on the surface of the carbon nanotube paper 14.

The mass percentage of the carbon nanotube film in the cathode electrode plate 12 is in a range from about 3% to about 10%. In one embodiment, the mass percentage of the carbon nanotube film in the cathode electrode plate 12 is in a range from about 4% to about 5%. When the cathode electrode plate 12 comprises 3 layers to 6 layers of carbon nanotube films, an amount of the cathode active material 124 per unit area of the carbon nanotube network structure 122 is in a range from 0.2 mg/cm$^2$ to 1.5 mg/cm$^2$. The amount of the cathode active material 124 per unit area of the carbon nanotube network structure 122 can be controlled by adjusting the concentration of the cathode active material 124 in the dispersing liquid and the times of spraying of the dispersing liquid.

Figure 8:
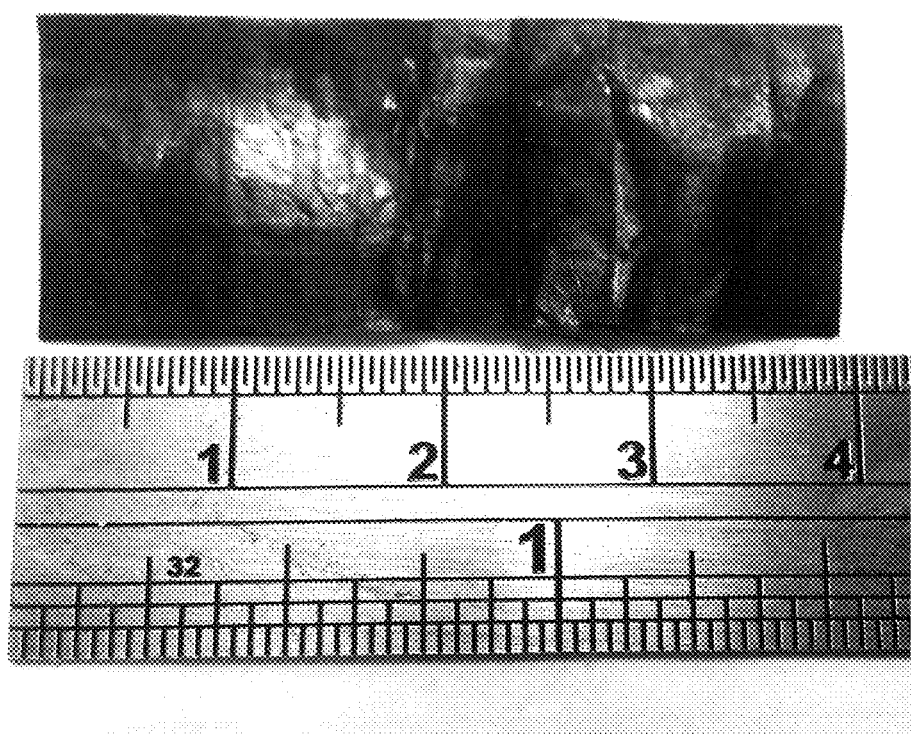
FIG. 8 is a photograph of a carbon nanotube paper of the lithium ion battery.

FIG. 8 illustrates that the carbon nanotube paper 14 is a black thin sheet and a free-standing structure. The carbon nanotube paper 14 can be as flexible as paper, durable for curving. The thickness of the carbon nanotube paper 14 can be in a range from about 500 nm to about 500 μm. The carbon nanotubes paper 14 can consist of about 500 layers to about 1000 layers of the carbon nanotube films stacked with each other. Each layer of carbon nanotube film comprises a plurality of carbon nanotubes arranged along the same direction. The carbon nanotube film is an ordered carbon nanotube film. The structure of the carbon nanotube film of the carbon nanotube film paper 14 can be the same as the structure of the carbon nanotube film of the cathode electrode plate 12. The carbon nanotube film of the carbon nanotube film paper 14 can be a free-standing carbon nanotube film that is drawn from the carbon nanotube array. The carbon nanotube film has an extremely large specific surface area, so the carbon nanotube film is very sticky. In the carbon nanotube paper 14, the adjacent carbon nanotube films can be combined together by van der Waals forces. Once the adjacent carbon nanotube films are stacked, the carbon nanotube films can form an integrated structure. The adjacent carbon nanotube films cannot be separated from each other.

In one embodiment, in the carbon nanotube paper 14 stacked by the carbon nanotube films, the carbon nanotubes of all the carbon nanotube films are aligned substantially along the same direction. The carbon nanotubes paper 14 has excellent electrical conductivity in this particular direction. The carbon nanotube paper 14 can be used as a current collector in the lithium ion battery to collect and conduct the current of the cathode electrode plate 12 to an external circuit.

In one embodiment, the direction of the carbon nanotubes of at least one carbon nanotube film in the cathode electrode plate 12 is the same direction of the carbon nanotubes in the carbon nanotube paper 14. That is to say, at least a portion of the carbon nanotubes in the cathode electrode plate 12 align along the same direction as the carbon nanotubes in the carbon nanotube paper 14. Thus, the contact area of the carbon nanotubes is increased when the carbon nanotube paper 14 contact with the cathode electrode plate 12. The combination of the cathode electrode plate 12 and the carbon nanotube paper 14 is firm.

The carbon nanotube paper 14 can be in direct contact with the cathode electrode plate 12. That is to say, the carbon nanotubes of the carbon nanotube paper 14 in direct contact with the carbon nanotubes of the cathode electrode plate 12. The carbon nanotubes of the cathode electrode plate 12 and the carbon nanotube paper 14 are combined only by van der Waals forces and without an adhesive. The carbon nanotube films of the carbon nanotube paper 14 and the cathode electrode plate 12 have extremely large specific surface area.

Once the carbon nanotube paper 14 and the cathode electrode plate 12 are stacked and combined by the van der Waals forces, it will be difficult to separate them from each other. In one embodiment, the cathode electrode plate 12 is smaller than the carbon nanotube paper 14, and located on a portion of the carbon nanotube paper 14. As shown in FIG. 1, the carbon nanotube paper 14 has a rectangle structure, and the cathode electrode plate 12 is located on one end of carbon nanotube paper 14. The other end of the carbon nanotube paper 14 can be used to connect to an external circuit.

The anode electrode 20 has the same structure as the cathode electrode 10. The anode electrode 20 comprises a carbon nanotube paper 24 and an anode electrode plate 22. The difference between the anode electrode 20 and the cathode electrode 10 is that the anode electrode 20 comprises the anode active material. The carbon nanotube paper 24 is the anode current collector of the lithium ion battery 100. The anode active material is not limited, can be a commonly used anode active material, such as lithium metal, alloy anode material, Sn-based material, silicon-based material, graphite carbon materials, amorphous carbon material and transition metal oxide. The transition metal oxide can be lithium titanate. In one embodiment, the amount of the anode active material in the anode electrode plate 22 is greater than the amount of the cathode active material 124 in the cathode electrode plate 12. For example, the amount of the anode active materials in the anode electrode plate 22 is 105% of the amount of the cathode active material 124 in the cathode electrode plate 12.

In the lithium ion battery 100, the cathode electrode 10 is stacked with the anode electrode 20. The cathode electrode plate 12 and the anode electrode plate 22 are spaced and face each other, so that the lithium ion can easily transfer between the cathode electrode plate 12 and the anode electrode plate 22. The electrolyte is disposed between the cathode electrode plate 12 and the anode electrode plate 22.

The lithium ion battery 100 can further comprise a separator 30. The separator 30 is located or sandwiched between the cathode electrode plate 12 and the anode electrode plate 22. The material of the separator 30 can be a polyolefin, such as polypropylene (PP) or polyethylene (PE), or inorganic material such as porous ceramics. In one embodiment, the electrolyte in the lithium ion battery 100 is liquid electrolyte solution, can soak the cathode electrode plate 12, the anode electrode plate 22, and the separator 30. The liquid electrolyte solution includes an organic solvent and a lithium salt dissolved in the organic solvent. The organic solvent can be selected from cyclic carbonates, linear carbonates, cyclic ethers, linear ethers, nitriles, and amides. The organic solvent also can be at least one of ethylene carbonate (EC), propylene carbonate (PC), ethylmethyl carbonate (EMC), diethyl carbonate (DEC), dimethyl carbonate (DMC), butylenes carbonate, vinylene carbonate, methylethyl carbonate, methyl acetate, ethyl acetate, propyl acetate, methyl propionate, ethyl propionate, γ-butyrolactone, 1,2dimethoxyethane, 1,2-diethoxyethane, tetrahydrofuran, 1,2-dioxane, 2-methyltetrahydrofuran, acetonitrile, and dimethylformamide. The lithium salt may be at least one of $LiPF_6$, LiBOB, $LiBF_4$, $LiSbF_6$, $LiAsF_6$, $LiClO_4$, $LiCF_3SO_3$, $Li(CF_3SO_2)2N$, $LiC_4F_9SO_3$, $LiSbF_6$, $LiAlO_4$, $LiAlCl_4$, LiCl, and LiI. In some embodiments, the electrolyte is a solid electrolyte membrane or polymer electrolyte membrane, and is sandwiched between the cathode electrode plate 12 and the anode electrode plate 22.

Figure 9:
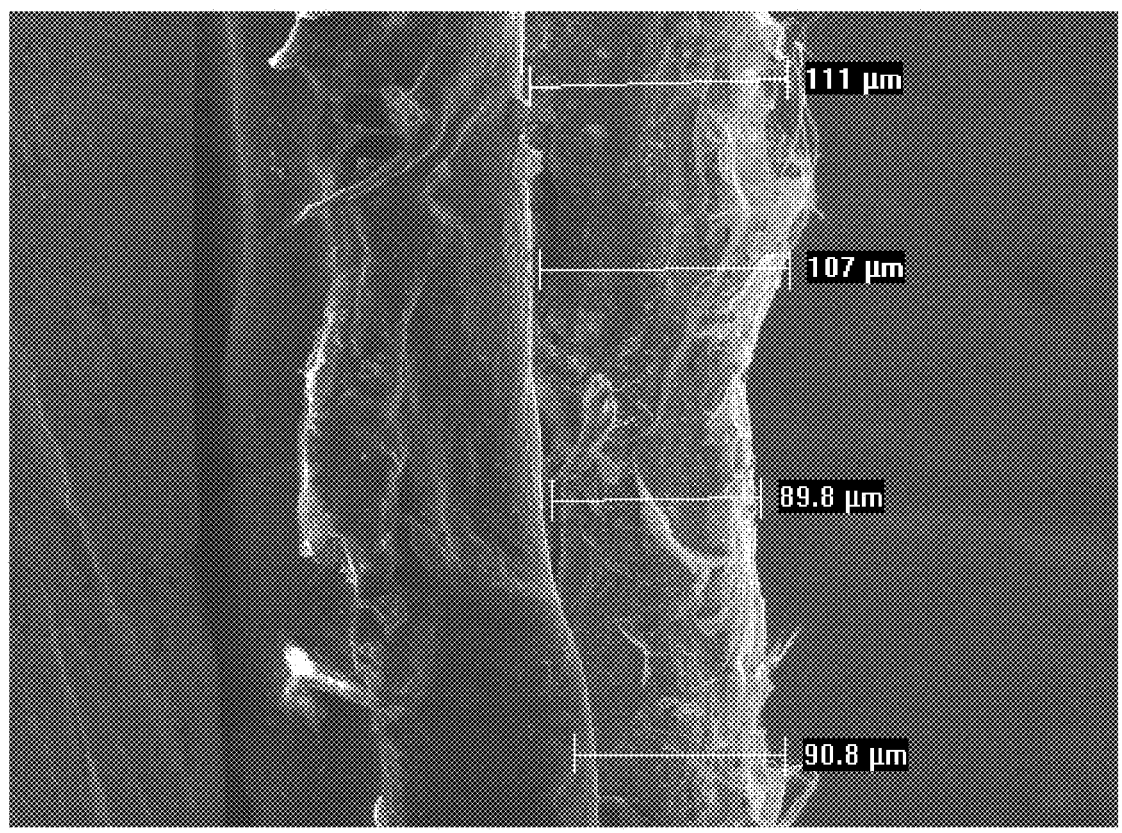
FIG. 9 is a SEM image of a side of a lamination of a cathode electrode, a separator, an anode electrode, and a conductive tape.

FIG. 9 illustrates that the cathode electrode 10, the separator 30, and the anode electrode 20 are stacked on a surface of a conductive tape to form a laminate. The separator 30 is sandwiched between the cathode electrode 10 and the anode electrode 20. FIG. 9 is a SEM image showing the thickness of the lamination from a side. In FIG. 9, the right part marked with thicknesses is the laminated cathode electrode 10, separator 30 and anode electrode 20, and the unmarked part on the left is the conductive tape. It can be seen from FIG. 9 that the thickness of the lamination (the cathode electrode 10, the separator 30, and the anode electrode 20) is substantially the same as the thickness of the conductive tape. Because the thicknesses of the cathode electrode plate 12, the anode electrode plate 22, the carbon nanotube paper 14 and the carbon nanotube paper 24 are very thin, the thickness of the lithium ion battery 100 that has one cathode electrode 10 and one anode electrode 20 can be in a range from about 80 μm to about 120 μm.

Figure 10:
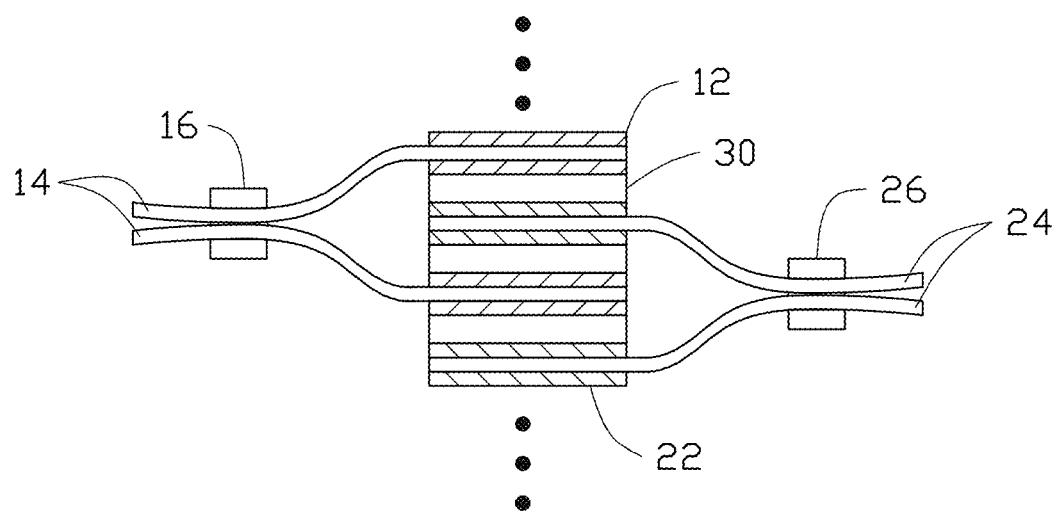
FIG. 10 is a side view of another embodiment of the lithium ion battery.

FIG. 10 illustrates that the lithium ion battery 100 can comprise a plurality of cathode electrodes 10 and a plurality of the anode electrodes 20. The plurality of cathode electrodes 10 and the plurality of the anode electrodes 20 are alternately stacked. The adjacent cathode electrode 10 and anode electrode 20 are spaced by the solid electrolyte membrane or the separator 30. In some embodiments, one cathode electrode 10 can comprise two cathode electrode plates 12 and one carbon nanotube paper 14. The two cathode electrode plates 12 are located on the same side and two opposite surfaces of the carbon nanotube paper 14. Similarly, one anode electrode 20 can comprise two anode electrode plates 22 and one carbon nanotube paper 24. The two anode electrode plates 22 are located on the same side and two opposite surfaces of the carbon nanotube paper 24. In the lithium ion battery 100, because a plurality of cathode electrodes 10 and a plurality of anode electrodes 20 are stacked alternatively, one carbon nanotube paper 14 can be shared by two cathode electrode plates 12, and one carbon nanotube paper 24 can be shared by two anode electrode plates 22.

Figure 11:
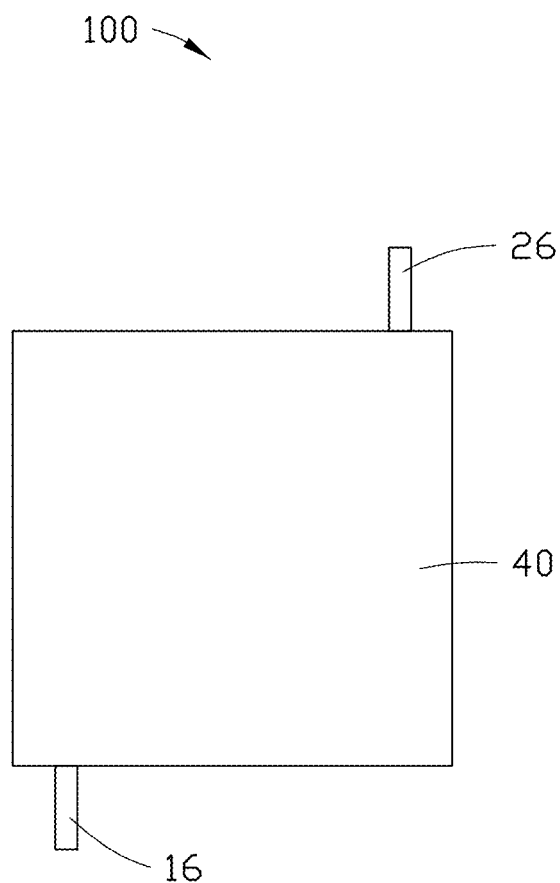
FIG. 11 is a top view of yet another embodiment of the lithium ion battery.

FIG. 11 illustrates that the lithium ion battery 100 can comprise a soft package structure 40, such as an aluminum-plastic film packaging bag, to enclose the cathode electrode 10, the anode electrode 20, the separator 30, and the electrolyte. The soft package structure is flexible and can be bent or curved. The cathode electrode plate 12, the separator 30, and the anode electrode plate 22 are stacked and encapsulated in the soft package structure 40. The electrolyte can be filled in the soft package structure 40. Furthermore, the lithium ion battery 100 can also comprise a cathode conductive lead structure 16 and an anode conductive lead structure 26 used as tabs of the lithium ion battery 100. One end of the cathode conductive lead structure 16 is inserted into the soft package structure 40 and connected with the carbon nanotube paper 14, and the other end of the cathode conductive lead structure 16 extends out from the soft package structure 40 and connected with an external circuit. Similarly, one end of the anode conductive lead structure 26 is inserted into the soft package structure 40 and connected with the carbon nanotube paper 24, and the other end of the anode conductive lead structure 26 extends out from the soft package structure 40 and connected with an external circuit. The cathode conductive lead structure 16 and the anode conductive lead structure 26 can be conductive metal strips, such as nickel strips. One end of the cathode conductive lead structure 16 is located on a surface of the carbon nanotube paper 14 and spaced from the cathode electrode plate 12. The other end of the cathode conductive lead structure 16 is extended out from the soft package structure 40. Similarly, one end of the anode conductive lead structure 26 is located on a surface of the carbon nanotube paper 24 and spaced from the anode electrode plate 22. The other end of the anode conductive lead structure 26 is extended out from the soft package structure 40.

In some embodiments, the cathode electrode plate 12 is located on one end of the carbon nanotube paper 14. The cathode conductive lead structure 16 is located on the other end of the carbon nanotube paper 14 without the cathode electrode plate 12. The anode electrode plate 22 is located on one end of the carbon nanotube paper 24. The anode conductive lead structure 26 is located on the other end of the carbon nanotube paper 24 without the anode electrode plate 22. The carbon nanotubes of the carbon nanotube paper 14 and the carbon nanotube paper 24 are arranged substantially along the same direction. In one embodiment, the length direction of the cathode conductive lead structure 16 is perpendicular to the direction of the carbon nanotubes of the carbon nanotube paper 14. Thus the carbon nanotubes of the carbon nanotube paper 14 extend substantially along the direction from the cathode electrode plate 12 to the cathode conductive lead structure 16. Similarly, the length direction of the anode conductive lead structure 26 is perpendicular to the direction of the carbon nanotubes of the carbon nanotube paper 24. Thus, the carbon nanotubes of the carbon nanotube paper 24 extend substantially along the direction from the anode electrode plate 22 to the anode conductive lead structure 26.

Each carbon nanotube paper 14 comprises a first end and a second end. The carbon nanotube paper 14 first end can be electrically connected with one cathode conductive lead structure 16. The carbon nanotube paper 14 second end can be located on the cathode electrode plate 12. Each carbon nanotube paper 24 comprises a first end and a second end. The carbon nanotube paper 24 first end can be electrically connected with one cathode conductive lead structure 26. The carbon nanotube paper 14 second end can be located on the cathode electrode plate 22. FIG. 10 illustrates when the lithium ion battery 100 comprises a plurality of cathode electrodes 10 and a plurality of anode electrodes 20. The plurality of cathode electrodes 10 and the plurality of anode electrodes 20 can be stacked alternately. The plurality of the carbon nanotube papers 14 first ends are directly stacked together and electrically connected with one cathode conductive lead structure 16. The plurality of the carbon nanotube papers 24 first ends are directly stacked together and electrically connected with one anode conductive lead structure 26. Each dot expresses that one cathode electrode 10 or one anode electrode 20.

The carbon nanotube paper 14 is a flexible structure and can be bent or folded as desired. For example, the cathode conductive lead structure 16 and the anode conductive lead structure 26 can be bent into a U shape or a circular shape, to clamp a plurality of the carbon nanotube papers 14 and a plurality of the carbon nanotube papers 24 respectively.

The ends of the carbon nanotube paper 14 and the carbon nanotube paper 24 that are connected to the cathode 16 and anode conductive lead structures 26 can be extended along two opposite directions. The cathode conductive lead structure 16 and the anode conductive lead structure 26 can be extended from two opposite ends of the package structure 40.

Figure 12:
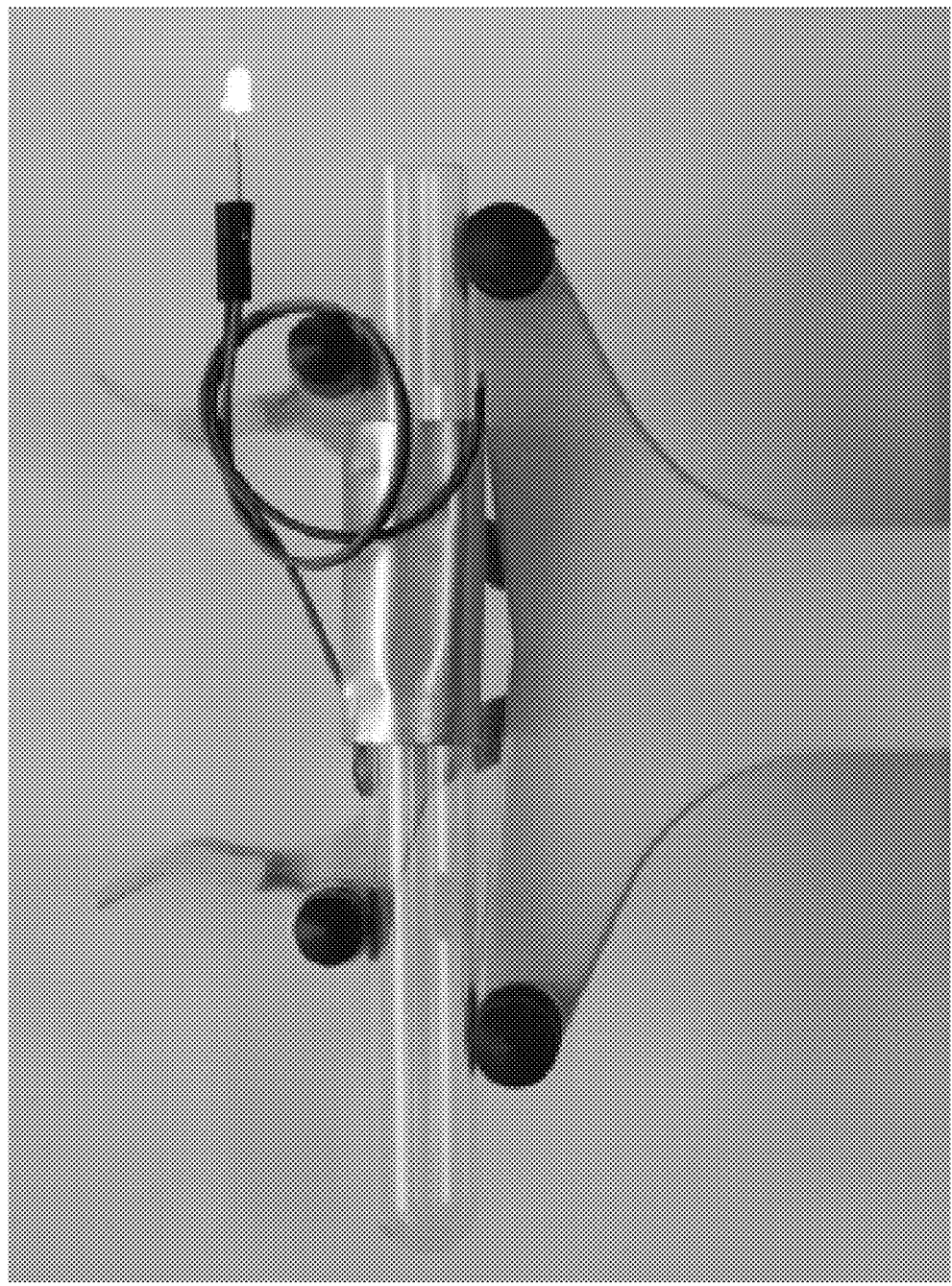
FIG. 12 is a photograph of a flexible lithium ion battery wrapping on a glass tube and a lamp lightened by the flexible lithium ion battery.

FIG. 12 illustrates that except for the material of the cathode lead structure 16 and anode conductive lead structure 26, which is metal, the material of the other part of the lithium ion battery 100 is flexible and durable for bending. Thus the lithium ion battery 100 can still work when it is curved, bent, or folded. The lithium ion battery 100 can be used in wearable electronic products, and does not hinder action and movement. In addition, even if the lithium ion battery 100 is used in conventional equipment, the lithium ion battery can have a light weight and high energy density due to the use of the carbon nanotube current collectors and electrode plates.

The lithium ion battery of the present embodiment the following advantages. First, the carbon nanotube paper is used as the current collector, and the cathode electrode plate and the anode electrode plate do not comprise the binder. Thus, the weight of the lithium ion battery is reduced. Second, the carbon nanotube film of the current collector, the cathode electrode plate, and the anode electrode plate have the extremely large specific surface area, thus, the current collector and the electrode plate can be firmly combined together. Further, the carbon nanotube paper and the carbon nanotube film are both flexible and durable for bending, thus the lithium ion battery is flexible. In the conventional lithium ion battery, the electrode plate and metal current collector are made of different materials, and the combination of the electrode plate and metal current collector is poor. During the changing of the shape of the current collector, the electrode plate will be easily peeled from the current collector, or the active material of the electrode plate will be pulverized. And the current collector is not flexible and durable for curving, thus the flexibility of conventional lithium ion battery is poor. Third, the carbon nanotubes of the drawn carbon nanotube films in the cathode electrode plate and the anode electrode plate are aligned along different direction to form a conductive network, thus the active material can be attached on the conductive network, which can improve the electrical conductivity of the electrode plate. Fourth, the active material can be uniformly dispersed in the carbon nanotube film.

Example 1

In Example 1, the cathode active material is lithium iron phosphate. The anode active material is lithium titanate. The amount of the carbon nanotube films in the each anode and cathode electrode plates is 6 layers. The carbon nanotube paper in the cathode electrode and the anode electrode are formed by stacking 500 layers of the carbon nanotube films. The thickness of one carbon nanotube paper is about 40 microns. Specifically, a method for making the cathode electrode plate includes following steps:

dispersing 1000 mg of lithium iron phosphate in 100 ml of ethanol;

dispersing the lithium iron phosphate uniformly by ultrasonic oscillation for 30 minutes to form a dispersing liquid;

spraying 10 ml the dispersing liquid on a surface of a first drawn carbon nanotube film which is suspended;

stacking a second drawn carbon nanotube film on the first carbon nanotube film sprayed by the dispersing liquid;

spraying 10 ml of the dispersing liquid on a surface of the second carbon nanotube film opposite to the surface sprayed by the dispersing liquid;

repeating the above steps to form the cathode electrode plate comprising six drawn carbon nanotube films.

The six carbon nanotube films are stacked with each other, to arrange the carbon nanotubes of the cathode electrode plate along the perpendicular orientation with each other. A method for making the anode electrode plate is the same as the method for making the cathode electrode plate above. The amount of the carbon nanotubes in the cathode electrode plate and the anode electrode plate are both 0.216 mg. The density of the carbon nanotubes on the surface of the cathode electrode plate and the anode electrode plate are both about 0.002 mg/cm². The shape of the carbon nanotube film is square. The area of the carbon nanotube film of the cathode electrode plate is 9 cm². The amount of the lithium iron phosphate in the cathode electrode plate is about 4.62 mg. The amount of the lithium titanate in the anode electrode plate is about 4.68 mg. The mass percentage of the carbon nanotubes in the cathode electrode plate is about 4.62%. The mass percentage of the carbon nanotubes in the anode electrode plate is about 4.67%. The cathode electrode plate is folded twice, and located on the surface of one drawn carbon nanotube paper to form the cathode electrode. The anode electrode plate is also folded twice, and located on the surface of the other drawn carbon nanotube paper to form the anode electrode.

Comparative Example 1

In Comparative Example 1, poly(vinylidene fluoride) (PVDF) is used as a binder, graphite is used as conductive agent, lithium iron phosphate is used as the cathode active material. The PVDF, graphite, and lithium iron phosphate are mixed with a mass ratio of 1:1:8 at first, and then the N-methylpyrrolidone (NMP) is added to form a cathode paste. The cathode paste is coated on a surface of an aluminum foil to form the cathode electrode. And an anode paste is formed by the same method of making the cathode paste. In the embodiment, the PVDF is used as a binder, the graphite is used as a conductive agent, and lithium titanate is used as the anode active material. The PVDF, graphite, and lithium titanate are mixed with a mass ratio of 1:1:8 at first, and then the NMP is added to form the anode paste. Then the anode paste is coated on a surface of copper foil to form the anode electrode.

Example 2

A half cell is assembled by using the cathode electrode of the Example 1, a lithium metal foil as the counter electrode, an electrolyte and a separator.

Comparative Example 2

A half cell is assembled by using the cathode electrode of the Comparative Example 1, a lithium metal foil as the counter electrode, an electrolyte and a separator. The electrolyte and the separator of the half cell in the Comparative Example 2 is the same as the electrolyte and the separator of the half cell in the Example 2.

Example 3

A half cell is assembled by using the anode electrode of the Example 1, a lithium metal foil as the counter electrode, an electrolyte and a separator.

Comparative Example 3

A half cell is assembled by using the anode electrode of the Comparative Example 1, a lithium metal foil as the counter electrode, an electrolyte and a separator. The electrolyte and the separator of the half cell in the Comparative Example 2 is the same as the electrolyte and the separator of the half cell in the Example 2.

Example 4

A lithium ion battery is formed by using the cathode electrode and the anode electrode of Example 1.

Cycle Tests of the Lithium Ion Batteries

Figure 13:
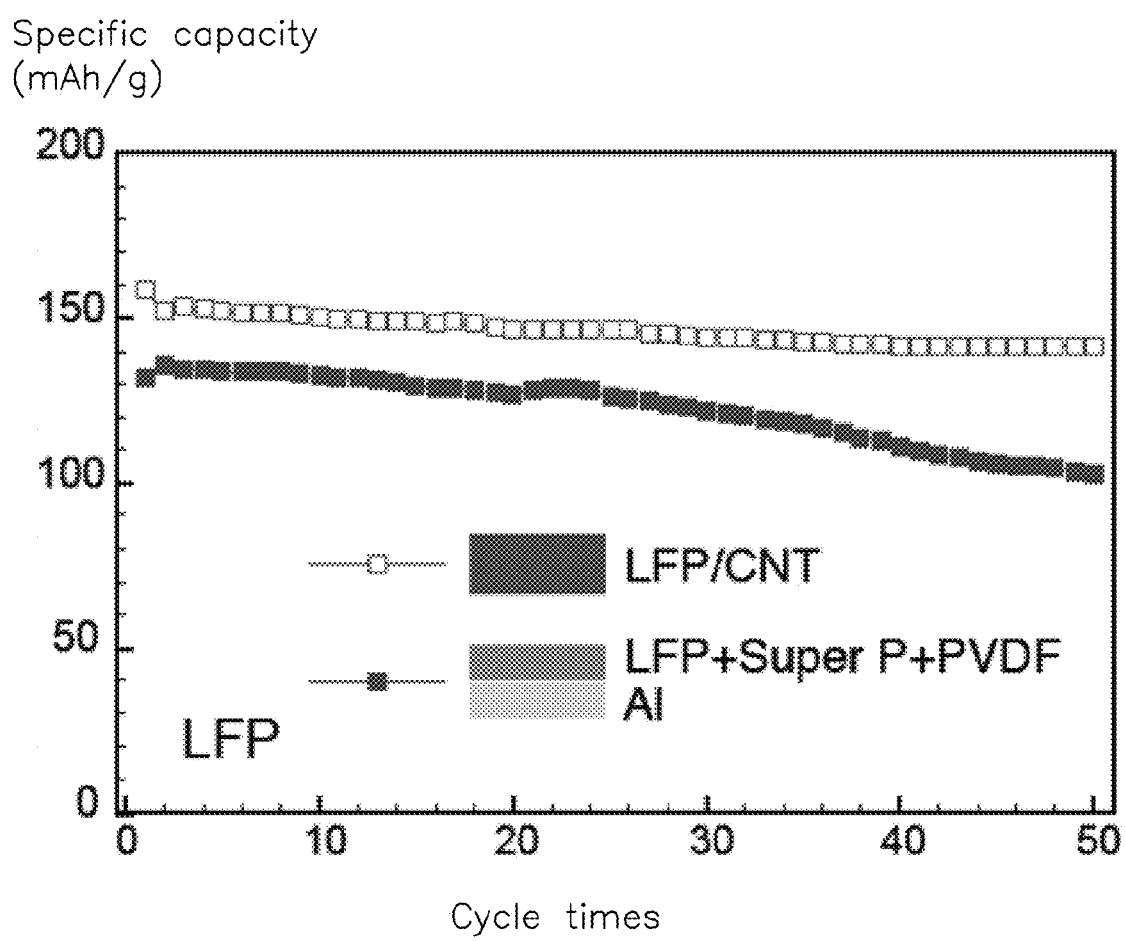
FIG. 13 is a graph showing cycle performances of half cells of example 2 and comparative example 2 cycled under the same condition.
Figure 14:
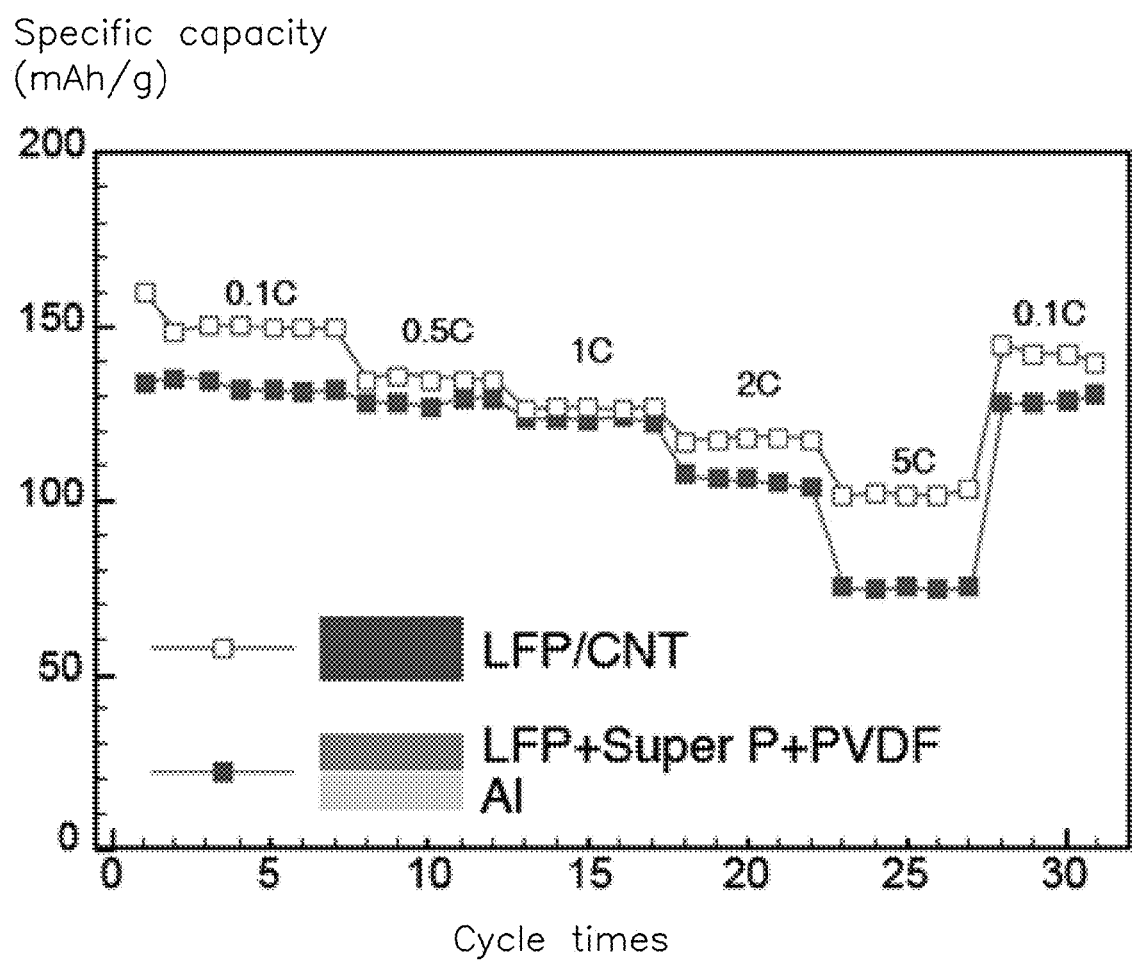
FIG. 14 a graph showing cycle performances of the half cells of the example 2 and the comparative example 2 respectively cycled under different current rates.
Figure 15:
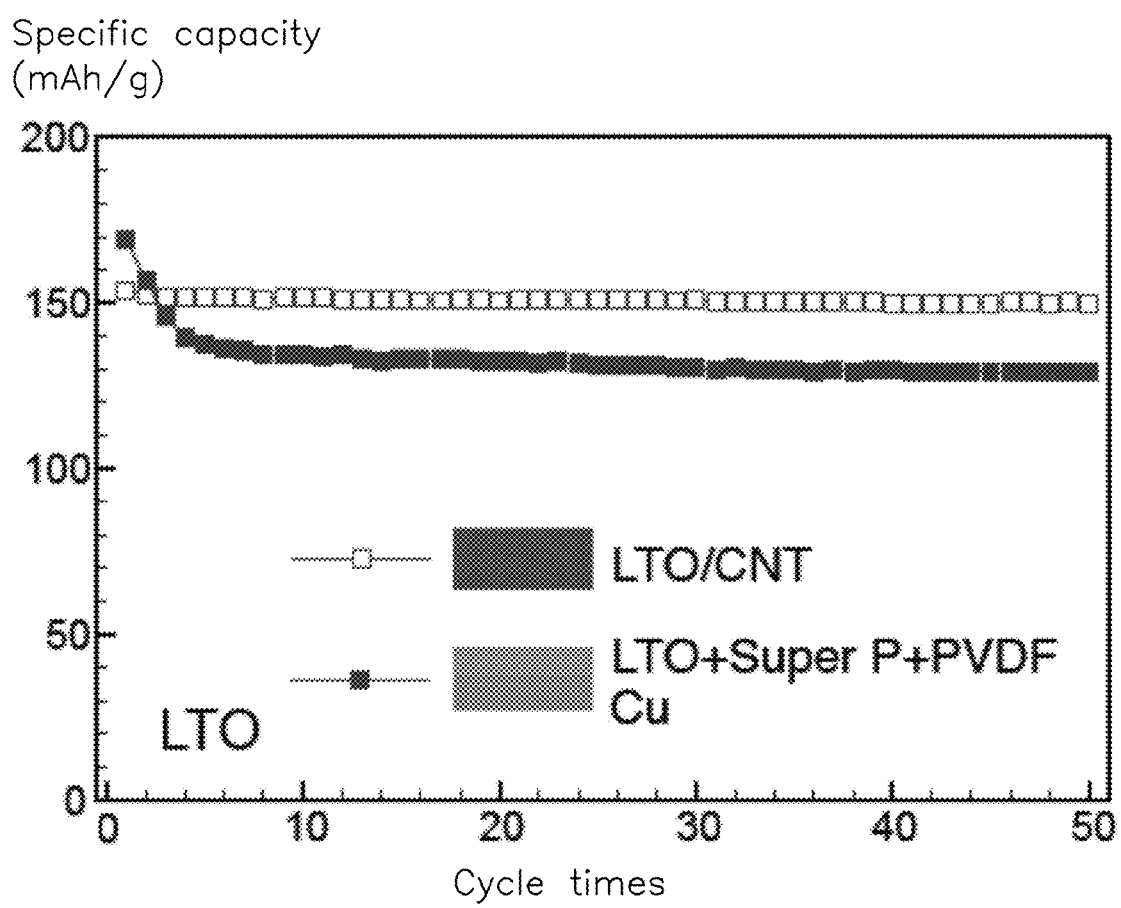
FIG. 15 is a graph showing cycle performances of half cells of example 3 and comparative example 3 cycled under the same condition.
Figure 16:
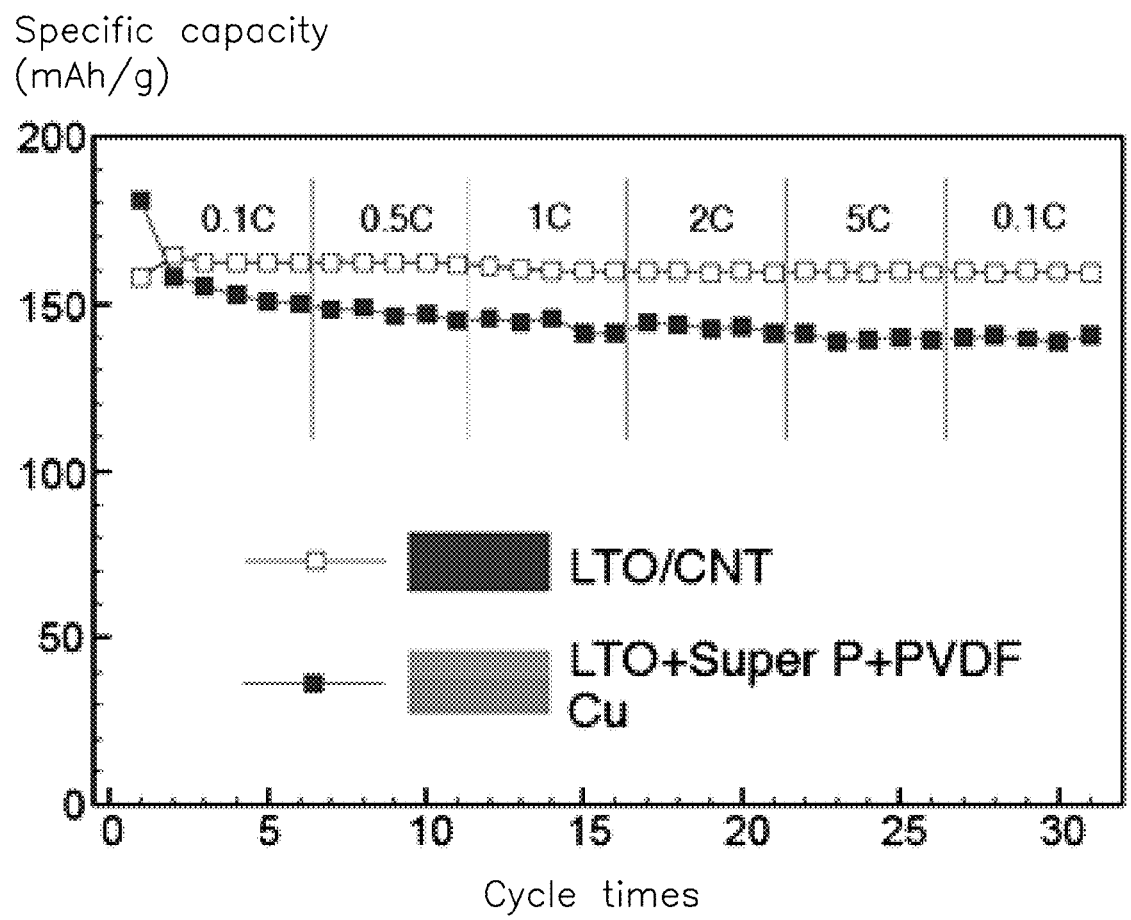
FIG. 16 is a graph showing cycle performances of the half cells of the example 3 and the comparative example 3 respectively cycled under different current rates.

FIG. 13 and FIG. 15 show that the half batteries of Example 2, Example 3, Comparative Example 2 and Comparative Example 3 are charged and discharged under the same condition. FIG. 14 and FIG. 16 show that the half batteries of Example 2, Example 3, Comparative Example 2 and Comparative Example 3 are tested under the different current rates. It can be seen from FIG. 13 to FIG. 16 that the cathode electrode and the anode electrode of Example 1 have better cycle performance and rate capability than the conventional electrode of Comparative Example 1.

Figure 17:
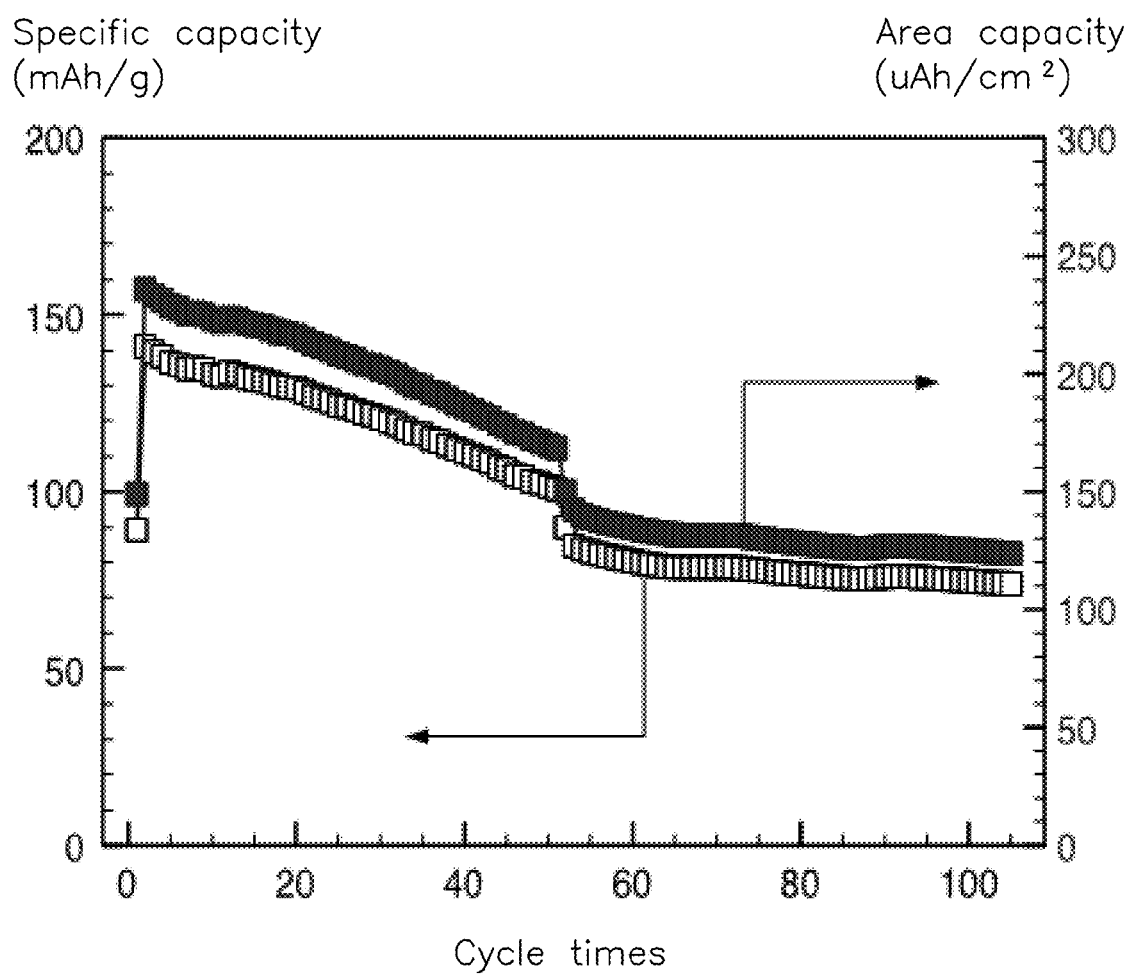
FIG. 17 is a graph showing the cycle performance of the lithium ion battery of example 4 cycled under different current rates.
Figure 18:
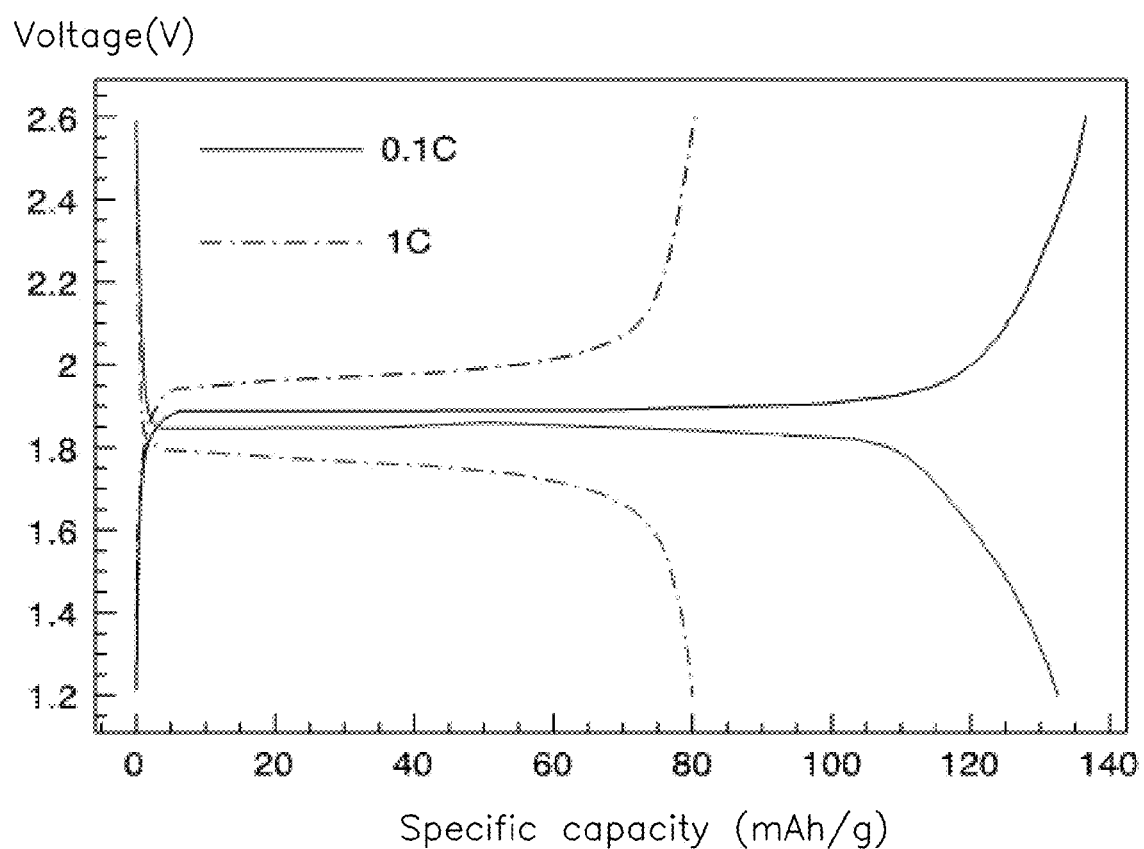
FIG. 18 is a graph showing charge and discharge voltage curves of the lithium ion battery of the example 4 respectively cycled under different current rates.

The lithium ion battery of Example 4 are charged and discharged 50 times in the current rate of 0.1 C (100 uA/cm²), and also charged and discharged 50 times in the current ratio of 1 C (1000 uA/cm²) by increasing the current rate. FIG. 17 and FIG. 18 show that the cycle capacity of the battery will almost be unaffected with the current rate of 0.1 C. When the current rate increases, the polarization of the battery will be increased, and the cycle capacity of the battery will decline. But on the whole, the lithium ion battery can still have stable cycle performance and keep high capacity after cycling 100 times.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A lithium ion battery comprising:
    at least one cathode electrode comprising:
        a cathode current collector consisting of at least one first carbon nanotube paper; and
        at least one cathode electrode plate, located on a surface of the at least one first carbon nanotube paper, wherein the at least one cathode electrode plate and the at least one first carbon nanotube paper define two different layers, and the at least one cathode electrode plate comprises:
a plurality of first carbon nanotube films stacked with each other; and
a cathode active material dispersed in at least one of the plurality of first carbon nanotube films;
at least one anode electrode comprising:
at least one second carbon nanotube paper; and
at least one anode electrode plate located on a surface of the at least one second carbon nanotube paper, comprising:
a plurality of second carbon nanotube films stacked with each other; and
an anode active material dispersed in at least one of the plurality of second carbon nanotube films;
an electrolyte located between the at least one cathode electrode plate and the at least one anode electrode plate.

2. The lithium ion battery of claim 1, wherein the at least one cathode electrode plate is located on a portion of the at least one first carbon nanotube paper, and the at least one anode electrode plate is located on a portion of the at least one second carbon nanotube paper.

3. The lithium ion battery of claim 2, further comprising a package structure, a cathode conductive lead structure, and an anode conductive lead structure; wherein a cathode conductive lead structure first end is located on the inside of the package structure and connected with the at least one first carbon nanotube paper and spaced from the at least one cathode electrode plate, a cathode conductive lead structure second end extends out from the package structure; an anode conductive lead structure first end is located on the inside of the package structure and connected with the at least one second carbon nanotube paper and spaced from the at least one anode electrode plate; an anode conductive lead structure second end extends out from the package structure.

4. The lithium ion battery of claim 3, wherein the package structure that is flexible and capable of being bended or curved.

5. The lithium ion battery of claim 1, wherein the at least one cathode electrode comprises a plurality of cathode electrodes, the at least one anode electrode comprises a plurality of anode electrodes, the plurality of cathode electrodes and the plurality of anode electrodes are stacked alternately; the at least one cathode electrode plate comprises a plurality of cathode electrode plates, the at least one first carbon nanotube paper comprises a plurality of first carbon nanotube papers, each cathode electrode comprises two of the plurality of cathode electrode plates and one first carbon nanotube paper, and the one first carbon nanotube paper is sandwiched between the two of the plurality of cathode electrode plates; the at least one anode electrode plate comprises a plurality of anode electrode plates, the at least one second carbon nanotube paper comprises a plurality of second carbon nanotube papers, each anode electrode comprises two of the plurality of anode electrode plates and one second carbon nanotube paper, and the one second carbon nanotube paper is sandwiched between the two of the plurality of anode electrode plates.

6. The lithium ion battery of claim 5, further comprising a cathode conductive lead structure and an anode conductive lead structure, wherein the plurality of first carbon nanotube papers are directly stacked with each other and connected to the cathode conductive lead structure; the plurality of second carbon nanotube papers are directly stacked with each other and connected to the anode conductive lead structure.

7. The lithium ion battery of claim 1, wherein the at least one second carbon nanotube paper is an anode current collector.

8. The lithium ion battery of claim 1, wherein the at least one first carbon nanotube paper consist of a first set of carbon nanotube films stacked with each other, and the at least one second carbon nanotube paper consist of a second set of carbon nanotube films stacked with each other.

9. The lithium ion battery of claim 1, wherein the at least one first carbon nanotube paper and the at least one second carbon nanotube paper are consisted of carbon nanotubes, and the carbon nanotubes are arranged substantially along the same direction.

10. The lithium ion battery of claim 1, further comprising a cathode conductive lead structure and an anode conductive lead structure, wherein a first set of carbon nanotubes of the at least one first carbon nanotube paper are extended substantially along a direction from the at least one cathode electrode plate to the cathode conductive lead structure; a second set of carbon nanotubes of the at least one second carbon nanotube paper are extended substantially along a direction from the at least one anode electrode plate to the anode conductive lead structure.

11. The lithium ion battery of claim 1, wherein the plurality of first carbon nanotube films and the plurality of second carbon nanotube films are consisted of carbon nanotubes.

12. The lithium ion battery of claim 1, wherein an amount of the cathode active material per unit area of the at least one cathode electrode plate is in a range from 0.2 mg/cm$^2$ to 1.5 mg/cm$^2$, and an amount of the anode active material per unit area in the at least one anode electrode plate is 0.2 mg/cm$^2$ to 1.5 mg/cm$^2$.

13. The lithium ion battery of claim 1, wherein the cathode active material is adsorbed on walls of carbon nanotubes of the plurality of first carbon nanotube films, and the anode active material is adsorbed on walls of the carbon nanotubes of the plurality of second carbon nanotube films.

14. The lithium ion battery of claim 1, wherein the plurality of first carbon nanotube films, the plurality of second carbon nanotube films, the at least one first carbon nanotube paper and the at least one second carbon nanotube paper comprise at least one carbon nanotoube film, the at least one carbon nanotoube film consist of at least one drawn carbon nanotube film.

15. The lithium ion battery of claim 1, wherein a thickness of the at least one first carbon nanotube paper is in a range from 500 nm to 500 μm, and a thickness of the at least one second carbon nanotube paper is in a range from 500 nm to 500 μm.

16. The lithium ion battery of claim 1, wherein the cathode active material is lithium iron phosphate, the anode active material is lithium iron phosphate, the cathode active material and the anode active material have a shape of particles or grains, a size of the cathode active material and the anode active material is in a rang from 0.1 nm to 100 μm.

17. A lithium ion battery comprising:
at least one cathode electrode comprising:
a cathode current collector consisting of a first carbon nanotube paper; and
a cathode electrode plate, located on a surface of the first carbon nanotube paper, wherein the cathode electrode plate and the at first carbon nanotube paper define two different layers, and the cathode electrode plate comprises:
a plurality of first carbon nanotube films stacked with each other; and a cathode active material dispersed in at least one of
the plurality of first carbon nanotube films;
at least one anode electrode comprising:
a second carbon nanotube paper; and
an anode electrode plate, located on a surface of the second carbon nanotube paper, consisting of:
a plurality of second carbon nanotube films stacked with each other; and
an anode active material dispersed in at least one of the plurality of second carbon nanotube films;
an electrolyte locating between the cathode electrode plate and the anode electrode plate.

\* \* \* \* \*